(12) United States Patent
LeFrancois

(10) Patent No.: US 9,007,393 B2
(45) Date of Patent: Apr. 14, 2015

(54) ACCURATE TRANSPARENCY AND LOCAL VOLUME RENDERING

(75) Inventor: Martin-Karl LeFrancois, Berlin (DE)

(73) Assignee: Mental Images GmbH, Berlin (DE)

( * ) Notice: Subject to any disclaimer, the term of this patent is extended or adjusted under 35 U.S.C. 154(b) by 2224 days.

(21) Appl. No.: 11/953,238

(22) Filed: Dec. 10, 2007

(65) Prior Publication Data

US 2008/0150943 A1 Jun. 26, 2008

Related U.S. Application Data

(60) Continuation-in-part of application No. 11/479,952, filed on Jun. 30, 2006, now Pat. No. 7,548,238, and a continuation-in-part of application No. 10/462,500, filed on Jun. 16, 2003, now Pat. No. 7,173,617, which is a division of application No. 10/232,069, filed on Aug. 30, 2002, now Pat. No. 6,606,092, which is a division of application No. 09/108,596, filed on Jul. 1, 1998, now Pat. No. 6,496,190.

(60) Provisional application No. 60/869,691, filed on Dec. 12, 2006, provisional application No. 60/696,120, filed on Jul. 1, 2005, provisional application No. 60/707,424, filed on Aug. 11, 2005, provisional application No. 60/051,507, filed on Jul. 2, 1997.

(51) Int. Cl.
*G09G 5/02* (2006.01)
*G06T 15/50* (2011.01)

(52) U.S. Cl.
CPC .................................. *G06T 15/503* (2013.01)

(58) Field of Classification Search
USPC .................................. 345/440, 420, 426, 424
See application file for complete search history.

(56) References Cited

U.S. PATENT DOCUMENTS

| | | | |
|---|---|---|---|
| 4,679,077 A | 7/1987 | Yuasa | |
| 5,745,601 A | 4/1998 | Lee | |
| 5,801,709 A | 9/1998 | Suzuki | |
| 6,057,859 A | 5/2000 | Handelman | |
| 6,137,899 A | 10/2000 | Lee | |
| 6,191,787 B1 | 2/2001 | Lu | |
| 6,215,495 B1 | 4/2001 | Grantham | |
| 6,266,053 B1 | 7/2001 | French | |
| 6,478,735 B1 | 11/2002 | Pope | |
| 6,496,190 B1 | 12/2002 | Driemeyer | |

(Continued)

FOREIGN PATENT DOCUMENTS

| | | |
|---|---|---|
| EP | 0 528 631 | 2/1993 |
| WO | 95 06298 | 3/1995 |

OTHER PUBLICATIONS

Everitt, "Order-Independent Transparency", Technical Report, NVIDIA Corporation, 2001.

(Continued)

*Primary Examiner* — Phi Hoang
(74) *Attorney, Agent, or Firm* — Zilka-Kotab, PC

(57) ABSTRACT

Systems, apparatus, computer software code products and methods for enabling computer graphics systems to accurately render transparency comprise configuring a shader element of the computer graphics system to first extract all layers of an image representation and obtain depth information therefrom, and then rendering all layers back-to-front with shading enabled, such that information obtained from a previously processed layer is available for processing of a current layer.

9 Claims, 20 Drawing Sheets

(56) References Cited

U.S. PATENT DOCUMENTS

| | | | |
|---|---|---|---|
| 6,578,197 | B1 | 6/2003 | Peercy |
| 6,597,359 | B1* | 7/2003 | Lathrop ........................ 345/440 |
| 6,606,092 | B2 | 8/2003 | Driemeyer |
| 7,015,909 | B1 | 3/2006 | Morgan |
| 7,176,919 | B2 | 2/2007 | Drebin |
| 7,180,518 | B2 | 2/2007 | Saito |
| 2004/0075661 | A1 | 4/2004 | Yamaguchi |
| 2004/0263511 | A1 | 12/2004 | West |
| 2005/0285858 | A1* | 12/2005 | Yang et al. .................... 345/420 |
| 2006/0028468 | A1* | 2/2006 | Chen et al. .................... 345/424 |
| 2006/0119600 | A1* | 6/2006 | Lokovic et al. ............... 345/426 |

OTHER PUBLICATIONS

Mental Images, "Functional Overview of mental mill", 2005.
Mental Images, "mental ray Phenomena", 1997.
Mental Images, "Design Specication for MetaSL", 2005.
Lefrancois, "Implementing the mental images Phenomena Renderer on the GPU", in "GPU Gems II", pp. 201-222, Addison-Wesley, 2005.
Driemeyer, ed., "Rendering with Mental Ray", 3rd ed. Springer, 2005.
Mental Images, "mental mill GUI Specification", 2005.
Mental Images, "mental mill Shader Debugger Prototype", 2005.
Abram, "Building Block Shaders", Computer Graphics, vol. 24, No. 4, Aug. 1990.
Whitted, "A Software Testbed for the Development of 3D Raster Graphics Systems," ACM Trans. Graphics, vol. 1, No. 1, Jan. 1982, pp. 43-58.
Cook, "Shade Tree," Proc. Siggraph 1984, in: Computer Graphics, vol. 18, No. 3, Jul. 1984, pp. 223-231.
Perlin, "An Image Synthesizer," Proc. Siggraph 1985, in: Computer Graphics, vol. 19, No. 3, Jul. 1985, pp. 287-296.
Egbert, Application Graphics Modeling Support Through Object Orientation, Computer, vol. 25, No. 10, Oct. 1, 1992, pp. 84-91.
Doellner, "Object-oriented 3D Modelling, Animation and Interaction," J. Visualization and Computer Animation, JanMar. 1997, vol. 18, No. 1, pp. 33-64.
Rost, Pex: A Network-Transparent 3D Graphics System, IEEE Computer Graphics and Applications, vol. 9, No. 4, Jul. 1989, pp. 14-26.
Pixar, "The Renderman Interface," Version 3.1, Sep. 1989, section 12 "Shader Execution Environment," pp. 109-114.

* cited by examiner

40

TRANSPARENCY MODULE, 10

LOCAL VOLUME MODULE, 20

REFRACTION, GLOSSY TRANS., SSSS, 30

FIG. 1

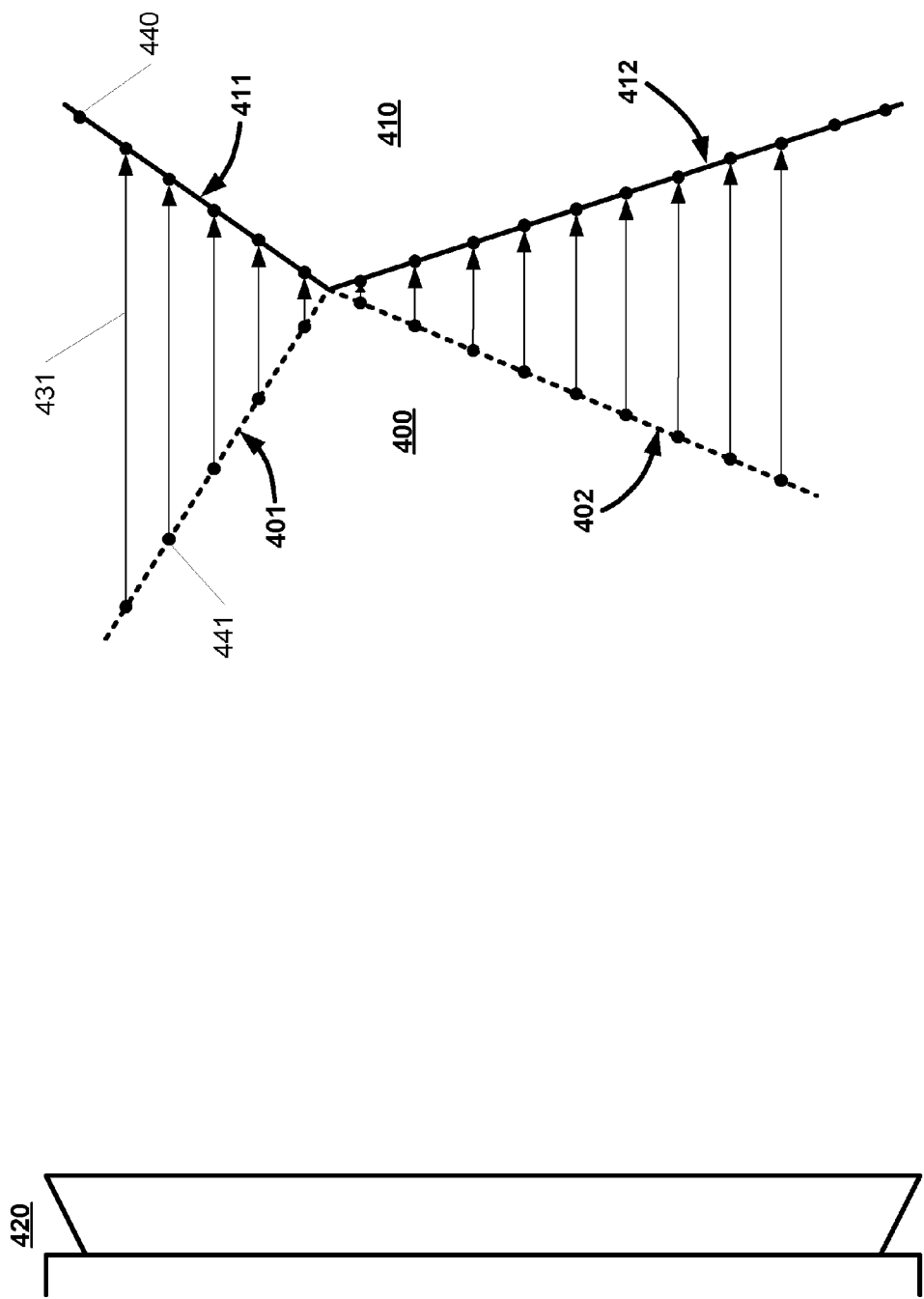

ACCURATE TRANSPARENCY AND LOCAL VOLUME RENDERING

CROSS-REFERENCE TO RELATED APPLICATIONS

This application for patent claims the priority benefit of U.S. Provisional Patent Application Ser. No. 60/869,691, filed Dec. 12, 2006, which is incorporated herein by reference in its entirety.

This application is also a Continuation-In-Part (CIP) of U.S. patent application Ser. No. 11/479,952 entitled "Computer Graphics Shader Systems and Methods", filed Jun. 30, 2006, which claims priority from U.S. Provisional Patent Applications 60/696,120 filed Jul. 1, 2005, and 60/707,424 filed Aug. 11, 2005, each of which is incorporated herein by reference.

The above-noted U.S. patent application Ser. No. 11/479,952 is a CIP of U.S. patent application Ser. No. 10/462,500 (now U.S. Pat. No. 7,173,617, which is a Divisional of U.S. patent application Ser. No. 10/232,069 (now U.S. Pat. No. 6,606,092, which is in turn a Divisional of U.S. patent application Ser. No. 09/108,596 (now U.S. Pat. No. 6,496,190, which claims the priority benefit of U.S. Provisional Patent App. 60/051,507 filed Jul. 2, 1997. Each of the foregoing is incorporated herein by reference in its entirety.

ADDITIONAL INCORPORATION BY REFERENCE

This application for patent also incorporates by reference the following United States and/or PCT applications and/or patents as if set forth herein in their entireties:

U.S. Pat. No. 6,496,190, issued Dec. 17, 2002, entitled "System and Method for Generating and Using Systems of Cooperating and Encapsulated Shaders and Shader DAGs for Use in a Computer Graphics System";

U.S. Provisional Application Ser. No. 60/696,120 filed Jul. 1, 2005, entitled "Computer Graphics Shader Systems and Methods";

U.S. Provisional Application Patent Ser. No. 60/707,424 filed Aug. 11, 2005, entitled "Improved Computer Graphics Shader Systems and Methods"; and U.S. patent application Ser. No. 11/479,952 and PCT Patent Application Serial No. PCT/US2006/025827, both entitled "Computer Graphics Shader Systems and Methods", and both filed Jun. 30, 2006 respectively).

Also incorporated by reference herein, by way of background, are the following:

Driemeyer, Thomas, ed., 2005, Rendering with Mental Ray, 3rd ed. Springer (hereinafter "Driemeyer 2005").

Everitt, Cass, 2001 (hereinafter Cass 2001), "Order-Independent Transparency", Technical Report, NVIDIA Corporation, available online at: http://developer.nvidia.com/view.asp?IO=order_independent transparency.

LeFrancois, Martin-Karl. 2005, "Implementing the mental images Phenomena Renderer on the GPU", GPU Gems II, edited by Matt Pharr, pp. 201-222, Addison-Wesley.

"Mental Mill Functional Overview" (hereinafter "Mill 2006"), available online at: http://www.mentalimages.com/mental_mill_functional_overview-Januar4-2006.pdf.

Each of the foregoing is incorporated by reference herein in its entirety.

FIELD OF THE INVENTION

The present invention relates generally to the field of computer graphics, and, more particularly, to methods, systems, apparatus, arrangements and computer program products adapted to enable efficient and accurate transparency and local volume rendering in computer graphics systems.

BACKGROUND OF THE INVENTION

Computer graphics systems are widely used in many industries, including computer-aided design (CAD) and in the creation of animated motion pictures.

In computer graphics, computer-aided geometric design and the like, an artist, draftsman or other user (generally referred to herein as an "operator") attempts to generate a three-dimensional representation of objects in a scene, as maintained by a computer, and in some cases thereafter render respective two-dimensional images of the objects in the scene from one or more orientations. In the first, representation generation phase, conventionally, computer graphics systems generate a three-dimensional representation from, for example, various two-dimensional line drawings comprising contours and/or cross-sections of the objects in the scene and by applying a number of operations to such lines that will result in two-dimensional surfaces in three-dimensional space, and subsequent modification of parameters and control points of such surfaces to correct or otherwise modify the shape of the resulting representation of the object.

During this process, the operator also defines various properties of the surfaces of the objects, the structure and characteristics of light sources which illuminate the scene, and the structure and characteristics of one or more simulated cameras which generate the images. After the structure and characteristics of the scene, light source(s) and camera(s) have been defined, in the second phase, an operator enables the computer to render an image of the scene from a particular viewing direction.

Programmable computer graphics hardware devices and systems have created the need for higher quality images than what the traditional graphic rendering pipeline can provide. One important visual feature when rendering an image is transparency. For ray-tracing, this is a common feature. At each intersection, a new ray is cast and will return the information from the hit point back to the current shader.

By way of example, the MetaSL language from MENTAL IMAGES GMBH of Berlin, Germany (see above-referenced patent applications and Mill 2006, incorporated herein by reference), which abstracts software and hardware shading, offers methods to trace rays and retrieve hit information at any position in the shader. The flexibility and the power of the MetaSL language enable functions beyond the simple blending operations that can be done between two rendered layers. In the MENTAL MILL computer software code product commercially available from MENTAL IMAGES GMBH of Berlin, Germany, shaders can be automatically generated in the MetaSL language, and can be easily modified by the user. Among other aspects, the MENTAL MILL system enables users to develop, test and maintain shaders and complex shader graphs for hardware and software rendering, through a graphical user interface (GUI) with real-time visual feedback. MENTAL MILL also enables the creation of complex, cooperating shader networks for generating photorealistic computer graphics effects, and complex, cooperating shader graphs can be encapsulated together into "MENTAL IMAGES Phenomena."

Prior to the advent of the present invention, different conventional methods existed to attempt to achieve transparency in computer graphics hardware rendering. Each conventional technique offers degrees of advantages and disadvantages with different speed and quality. Unfortunately, none of the conventional techniques correctly handles transparent or translucent materials.

It is therefore desirable to provide new methods, systems, arrangements, and computer software program code products operable to correctly handle the computer graphics rendering of transparent or translucent materials.

SUMMARY OF THE INVENTION

The present invention, which is described in detail below, provides a new and accurate technique for rendering transparent objects, for performing local volume rendering, and for achieving other effects related to semi-transparent objects. Among other aspects, the techniques described herein make available to the surface shader (see, e.g., LeFrancois 2005 listed above and incorporated by reference herein), the information needed to compute transparency or other desired effect.

The invention provides systems, apparatus, computer software code products and methods for enabling computer graphics systems to accurately render transparency, comprising, among other aspects: configuring a shader element of the computer graphics system to first extract all layers of an image representation and obtain depth information therefrom, and then rendering all layers back-to-front with shading enabled, such that information obtained from a previously processed layer is available for processing of a current layer.

Systems, apparatus, computer program products and methods in accordance with the invention are suitable for implementation or execution in a computer graphics system for rendering images for storage or for display on a display element, the computer graphics system being of the type comprising a shader for shading elements and layers of an image representation, the displaying comprising the display of images on the display element, and wherein the rendering of an image comprises utilizing the shader and the computer graphics system to generate pixel values corresponding to pixels in an image representation.

One aspect of the invention comprises configuring the shader or other appropriate elements of a computer graphics system to execute a transparency rendering method, the transparency rendering method comprising: (A) first extracting a plurality of layers of an image representation and obtaining depth information therefrom, and (B) then rendering the plurality of layers back-to-front with shading enabled, such that information obtained from a previously processed layer is available for processing of a current layer, to enable accurate rendering of transparency.

Another aspect of the invention comprises configuring the shader or other appropriate elements of the computer graphics system to execute local volume rendering, using information obtained from the layer extracting. The executing of local volume rendering can comprise utilizing ray marching.

A further aspect of the invention comprises executing a refraction method, the refraction method comprising projecting a ray in 2D, sampling pixels along the ray and utilizing information relating to the normal of a current hit and depth to the next hit made available when sampling the pixels.

Still another aspect of the invention comprises calculating glossy transparency by executing sampling around a selected area, and combining information relating to the depth layer with information relating to the sampling radius.

A further aspect of the invention comprises utilizing information relating to distance to an illumination source and shadow map information within a local volume shader, to create simulated sub-surface scattering effects.

These and other aspects will be discussed in greater detail below in the following Detailed Description of the Invention and in connection with the attached drawing figures.

BRIEF DESCRIPTION OF THE DRAWINGS

FIG. 1 is a schematic block diagram of Transparency and Local Volume rendering modules and modules for processing Refraction, Glossy Transparency, and Simulated Sub-Surface Scattering, in accordance with aspects of the present invention.

FIGS. 8A-8F are a series of diagrams further illustrating a depth-peeling and back-to-front rendering technique according to the present invention.

DETAILED DESCRIPTION OF THE INVENTION

Figure 2:
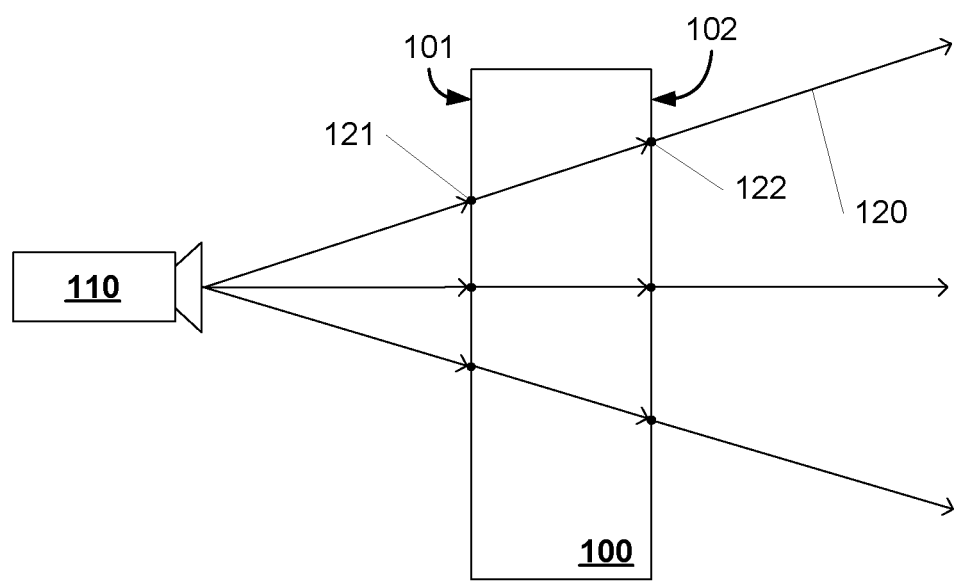
FIG. 2 is a diagram illustrating how a transparency effect is achieved in a rasterizer.

The invention will next be described in detail in the following pages, taken in connection with the attached drawing figures. Those skilled in the art will appreciate that various additions, subtractions, and other modifications and implementations of the invention can be practiced, and are within the spirit and scope of the present invention.

As discussed herein, various aspects of the present invention can be implemented as methods, apparatus or computer software code products (e.g., hardware, software, or a combination of hardware and software) adapted for execution or implementation in a computer graphics system. The present invention can be used, for example, in conjunction with the MENTAL MILL products and systems commercially available from MENTAL IMAGES GMBH of Berlin, Germany, or in conjunction with a wide range of other commercially available computer graphics systems, products, environments, hardware and software that provide shader functionality.

By way of example, as discussed in greater detail below, known forms of integrated circuit or semiconductor elements such as ASICS can be implemented in such a manner, using the teachings of the present invention described herein, to carry out the methods of the present invention as shown, for example, in the attached drawings and discussed herein, and to implement Transparency and Local Volume rendering modules 10 and 20 and modules for Refraction, Glossy Transparency, and Simulated Sub-Surface Scattering (SSSS) (collectively 30) within processing system 40, as shown in FIG. 1. Additional examples of suitable digital processing environments in which aspects of the invention may be implemented are set forth below and the accompanying drawings.

The following description is organized into the following sections:
1. Transparency
2. A New Transparency Technique
    2.1 First Step: Extracting All Layers
    2.2 Second Step: Rendering Layers Back To Front
    2.3 Results
    2.4 Further Example
3. Local Volume Rendering
4. Refraction
5. Glossy Transparency
6. Simulated Sub-Surface Scattering
7. Combined Method
8. Conclusion
9. Digital Processing Environment in Which Invention Can Be Implemented

1. TRANSPARENCY

Different techniques are currently used to render transparent objects, including: screen dithering, back-to-front rendering, order-independent rendering and depth-peeling. These techniques provide different qualities in the final image, but none of them gives perfect results.

One problem with conventional order-independent transparency is the lack of control when blending back the different layers. Too much information is lost in the process, and the only operation available between the different layers is a simple operation done on the alpha channel. This limitation produces artifacts that can be hard to overcome. The proper technique to retrieve the color of the next intersection would be to cast a ray and return the hit information to the fragment shader.

In accordance with the present invention, it is possible, without implementing a ray tracer, to simulate a ray cast to an object in the eye-ray direction. The information which needs to be available is the color of the hit and the distance to the hit point.

FIG. 2 is a diagram illustrating how a transparency effect is achieved in a rasterizer. As used herein, the term "rasterizer" refers to a rendering technique in which three-dimensional elements, such as polygons, are projected to pixels in the framebuffer. In FIG. 2, a transparent object 100 having a front surface 101 and a rear surface 102 is being viewed by a camera 110. Three illustrative rays 120 are shown that extend from the camera 110 through the object 100. As shown in FIG. 2, there is a first set of hit points 121 where each ray 120 intersects the transparent object's front surface 101, and a second set of hit points 122 where each ray 120 intersects the transparent object's rear surface 102. Each ray 120 then proceeds through the scene, where there may be one or more additional hit points as the ray 120 intersects other surfaces in the scene.

2. A NEW TRANSPARENCY TECHNIQUE

From FIG. 2, it will be seen that in order for a fragment shader to properly shade each hit surface of a transparent object 120, it is necessary to make available to the fragment shader the hit information from the layers of the scene underlying the surface being shaded. Thus, in order to properly shade the rear surface 102 of the transparent object 100, the shader must have available to it the hit information from any surfaces intersected by the rays 120 exiting the object 100.

Similarly, in order to properly shade the front surface 101 of the transparent object 100, the shader must have available to it the hit information from the layers of the scene underlying the front surface 101. It will be seen from FIG. 2 that this underlying layer hit information includes the hit information from rear surface 102, as well as hit information from any surfaces intersected by the rays 120 exiting the object 100.

It therefore follows that to make the "next hit" information available to the current fragment shader, the underlying layer must be already rendered. In accordance with the presently described techniques, in order to make the "next hit" information available to the shader, all peeled layers are rendered back to front, as described in greater detail below.

2.1 FIRST STEP

Extracting All Layers

It is first necessary to drill down all layers to be able to render them back to front. The depth of all layers must be kept in separated textures, to be used in the second step, described below in Section 2.2. Only the depth information is needed in this step.

Figure 3:
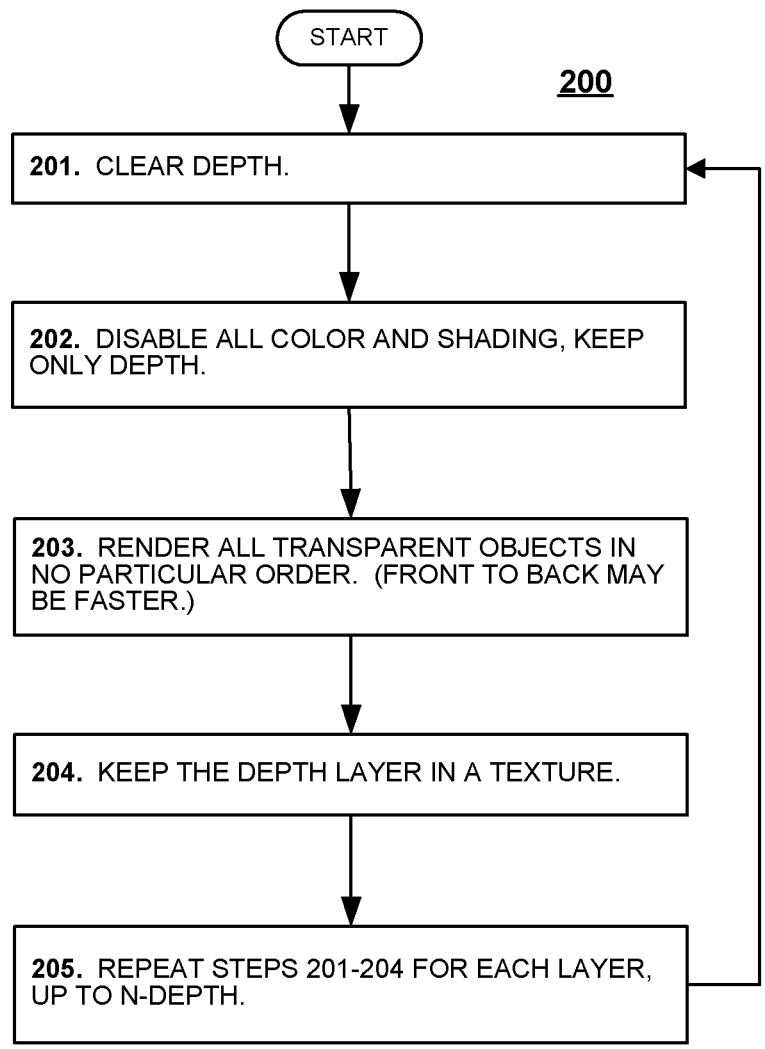
FIG. 3 is a flowchart of a depth-peeling technique according to an aspect of the invention.

FIG. 3 is a flowchart of a depth-peeling technique 200 according to the presently described aspect of the invention. As illustrated in FIG. 3, the technique 200 is performed as follows (no shading, and only depth is ON):

Box 201—Clear depth.
Box 202—Disable all color and shading, keep only depth.
Box 203—Render all transparent objects in no particular order. Front to back may be faster.
Box 204—Keep the depth layer in a texture.
Box 205—Repeat steps 201-204 for each layer, up to n-depth.

Figure 4:
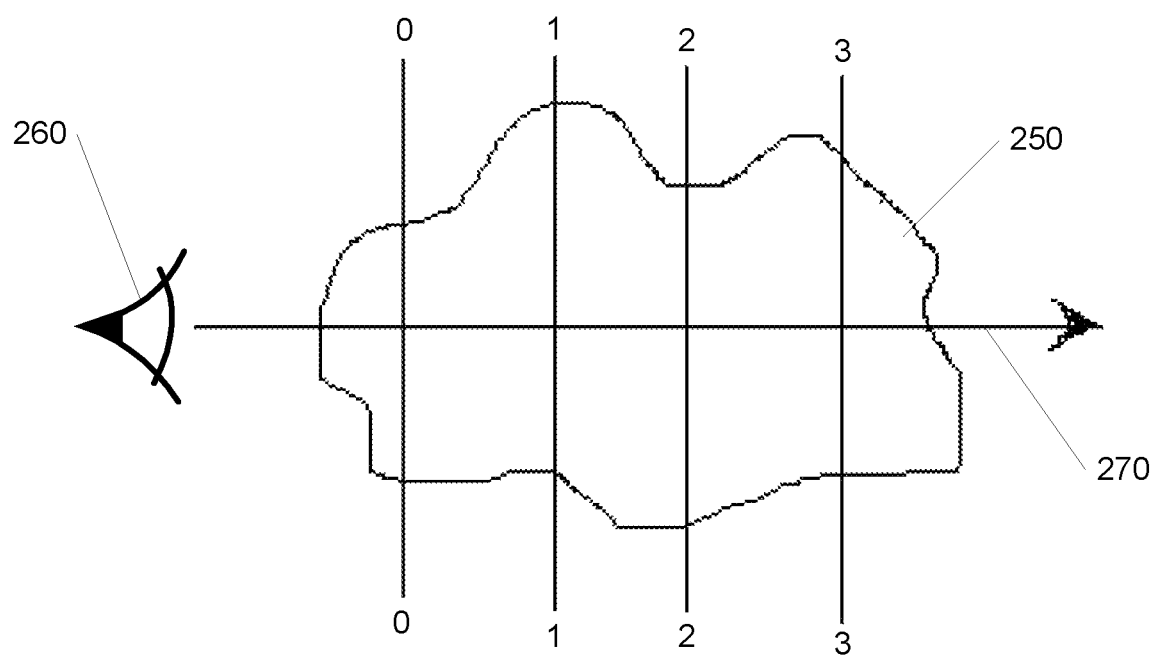
FIG. 4 is a diagram illustrating the described depth-peeling technique.

FIG. 4 is a diagram illustrating the peeling of the depth layers. In FIG. 4, a transparent object 250 is viewed by a camera 260. An exemplary ray 270 is shot from the camera 260 through the object 250. Each vertical line 0-0, 1-1, 2-2, and 3-3 represents a peeled depth containing the distance to the camera. Each depth layer is stored for later use, for peeling or to get the information about the relative distance from the current layer.

2.2 SECOND STEP

Rendering Layers Back To Front

Figure 5:
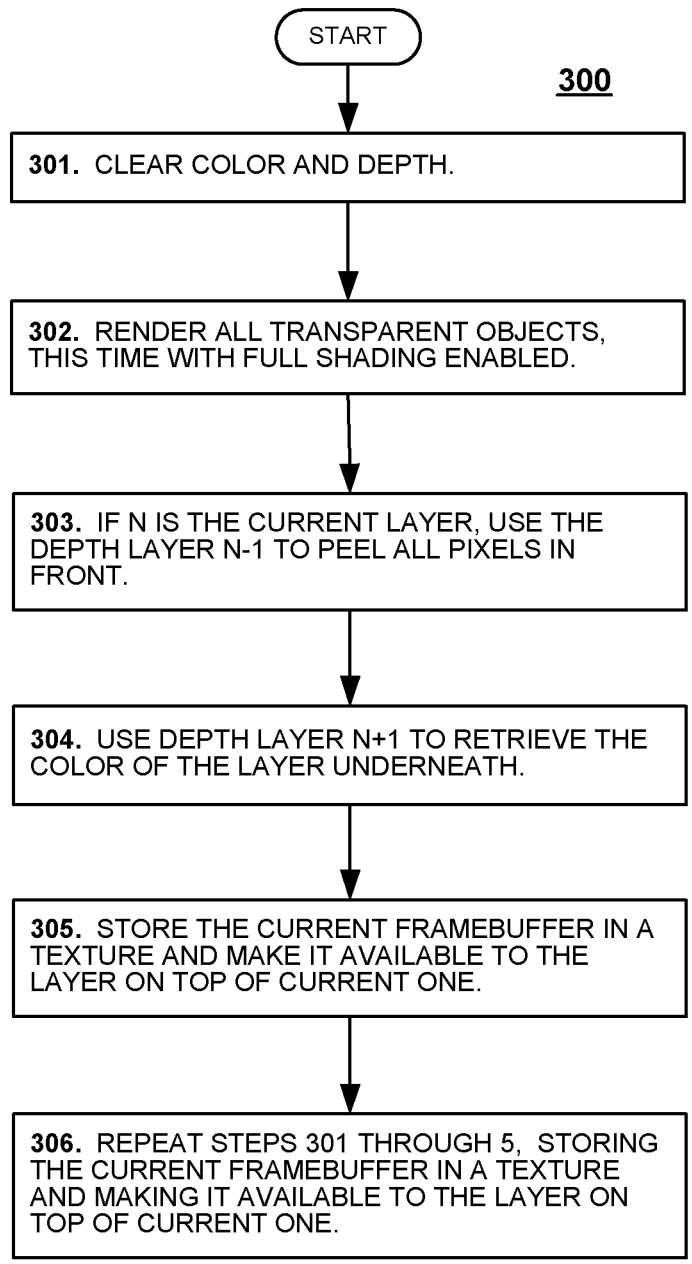
FIG. 5 is a flowchart of a reverse depth-peeling technique according to a further aspect of the invention.

FIG. 5 is a flowchart of a reverse depth-peeling technique 300 according to a further aspect of the invention. With depth layers available, all layers can now be rendered back-to-front with full shading enabled. As shown in FIG. 5, the technique is performed as follows:

Box 301—Clear color and depth.
Box 302—Render all transparent objects, this time with full shading enabled.
Box 303—If n is the current layer, use the depth layer n−1 to peel all pixels in front.
Box 304—Use depth layer n+1 to retrieve the color of the layer underneath.
Box 305—Store the current framebuffer in a texture and make it available to the layer on top of current one.

Box 306—Repeat steps 301 through 305 store the current framebuffer in a texture and make it available to the layer on top of current one.

Figures 6A, 6B, 6C, 6D:
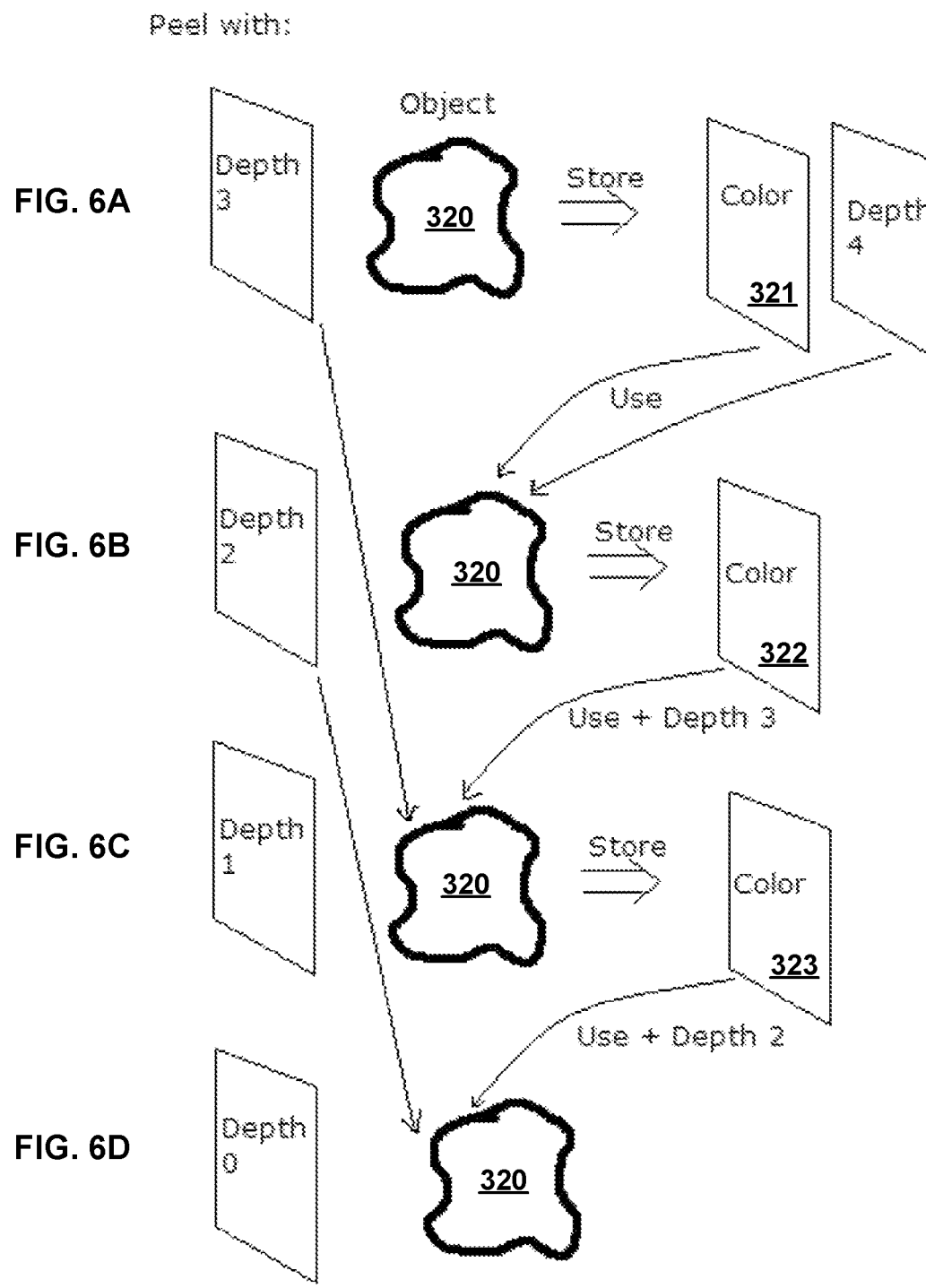
FIGS. 6A-6D are a series of diagrams illustrating the described reverse depth-peeling technique.

FIGS. 6A-6D are a series of diagrams of an object 320 illustrating how the rendering of the four layers is performed after the depth layers are collected. In FIG. 6A, depth layer 3 is the current layer. Depth layer 2 is used to peel all pixels in front. Depth layer 4 is used to retrieve the color information 321 of the layer underneath (i.e., the background). The framebuffer for depth layer 3 is stored in a texture, and is made available to depth layer 2.

In FIG. 6B, depth layer 2 is the current layer. Depth layer 1 is used to peel all pixels in front. The framebuffer for depth layer 3 is used to retrieve the color information 322 from the underlying layers. (Note that it is not necessary to collect the depth layer in the second pass, because the depth layer will be equal to the one use in the previous layer to peel.) The framebuffer for depth layer 2 is stored in a texture, and is made available to depth layer 1.

In FIG. 6C, depth layer 1 is the current layer. Depth layer 0 is used to peel all pixels in front. The framebuffer for depth layer 2 is used to retrieve the color information 323 from the underlying layers. The framebuffer for depth layer 1 is stored in a texture, and is made available to depth layer 0.

In FIG. 6D, depth layer 0 is the current layer. Because depth layer 0 is the top layer, no pixels are peeled. The framebuffer for depth layer 1 is used to retrieve the color information from the underlying layers. The rendering of the transparent object 250 is now complete.

2.3 RESULTS

Figure 7:
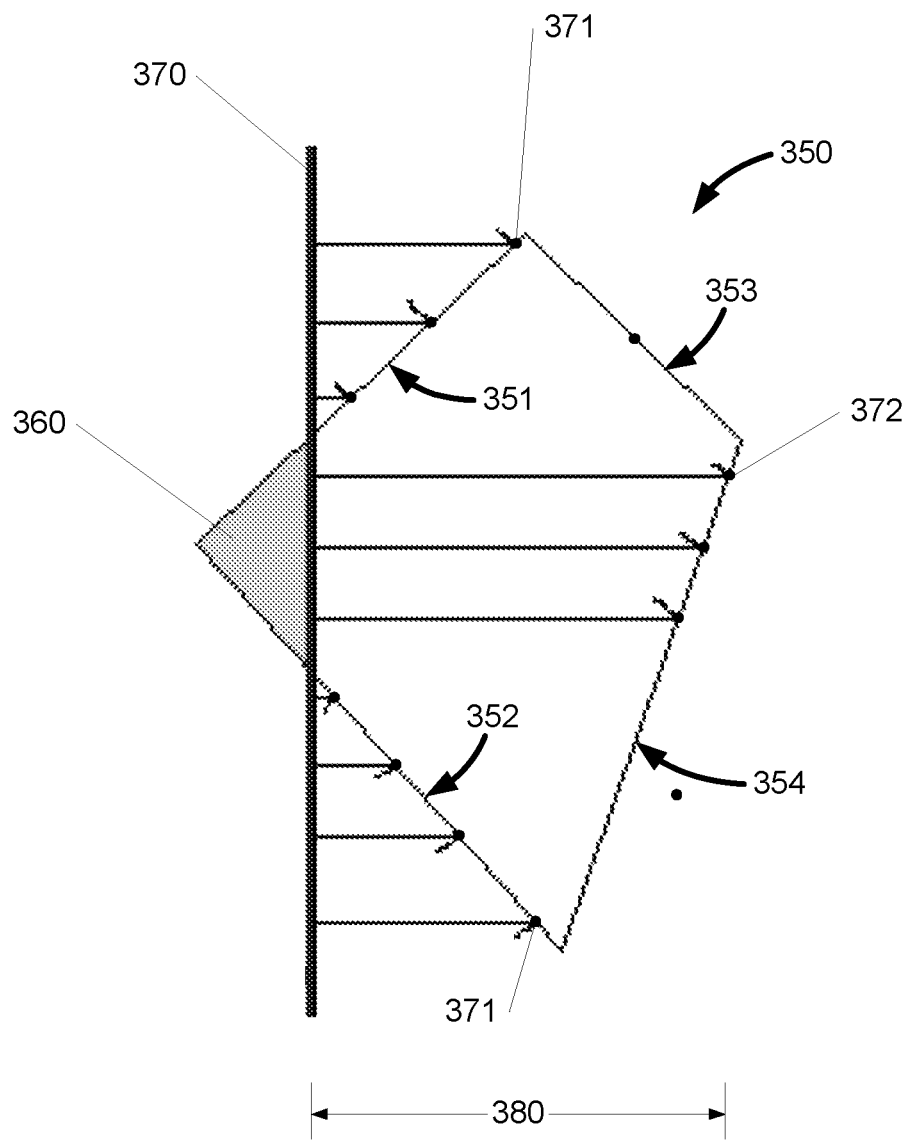
FIG. 7 is a diagram of an exemplary transparent object illustrating how the information from underlying layers is made available to a current layer being shaded.

Rendering all intersection layers provides a way to render back-to-front in a scene of unsorted triangles where each deeper layer is available to the current rendering layer. FIG. 7 is a diagram of an exemplary transparent object 350 illustrating how the information is made available to the current layer. The transparent object 350 includes two front surfaces 351 and 352, and two rear surfaces 353 and 354. The peeled-off portion of the object is depicted as shaded region 360, and the current layer is depicted as heavy line 370.

At shown in FIG. 7, the current layer 370 has available to it information 380 from hit points 371 on those portions of front surfaces 351 and 352 that underlie the current layer 370 (i.e., the unshaded portions or front surfaces 351 and 352). In addition, the current layer 370 has available to it hit points 372 on those portions of rear surfaces 353 and 354 that are not occluded by front surfaces 351 and 352. It should be noted that, because the object 350 is rendered back-to-front, front surfaces 351 and 352 include hit point information from the portions of the rear surfaces 353 and 354 that underlie front surfaces 351 and 352.

With the color and the distance of the transparent ray hit available in the fragment shader, all calculations of the BRDF are made within the fragment without losing information. This means that the alpha channel is preserved, RGB transparency can be done and combining reflection and transparent layers will be accurate.

2.4 FURTHER EXAMPLE

FIGS. 8A-8F are a series of diagrams further illustrating the above-described techniques.

Figure 8A:
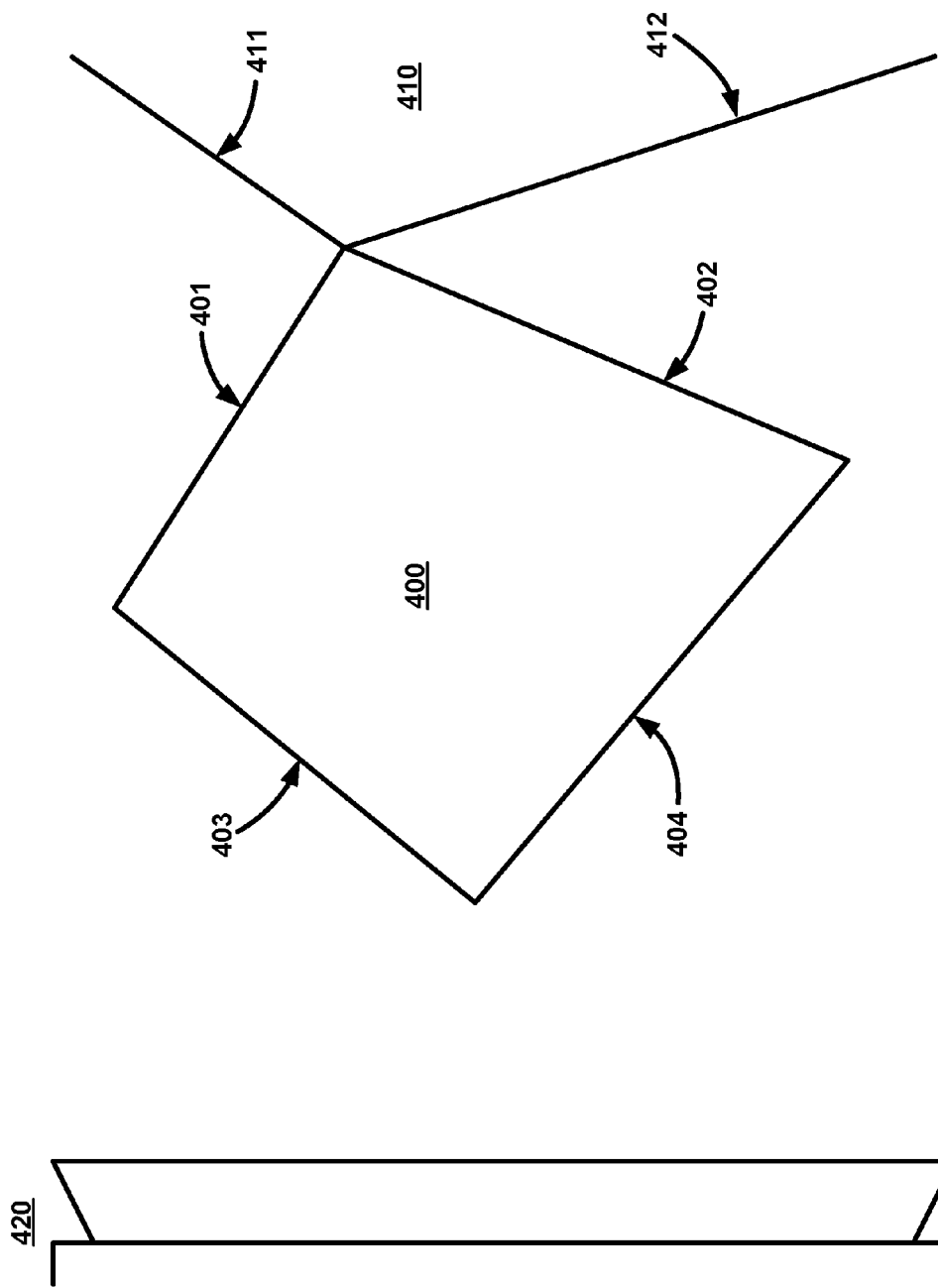

FIG. 8A shows a first object 400 and a second object 410 that are viewed by a camera 420. For the purposes of the present description, it is assumed that it is desired to render the first object 400 as a transparent object, and the second object 410 as a solid object. First object 400 includes rear surfaces 401 and 402, and front surfaces 403 and 404. Second object 410 includes front surfaces 411 and 412. (The remaining surfaces of second object 410 are not shown in FIG. 8A.)

Figure 8B:
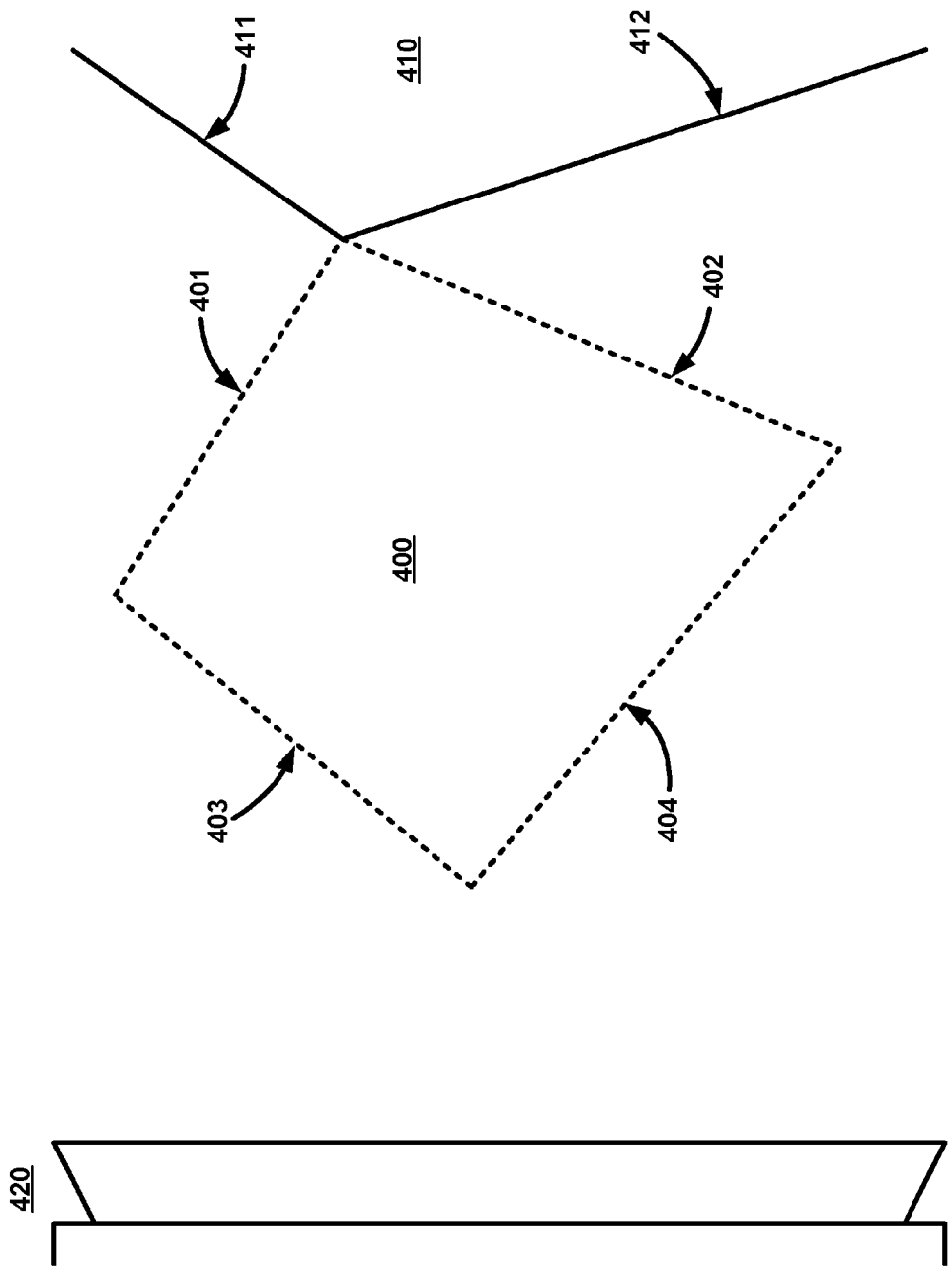

In FIG. 8B, first object 400 has been rendered using only depth information, indicated by the use of broken lines for surfaces 401-404. Second object 410 has been fully rendered as a solid object.

Figure 8C:
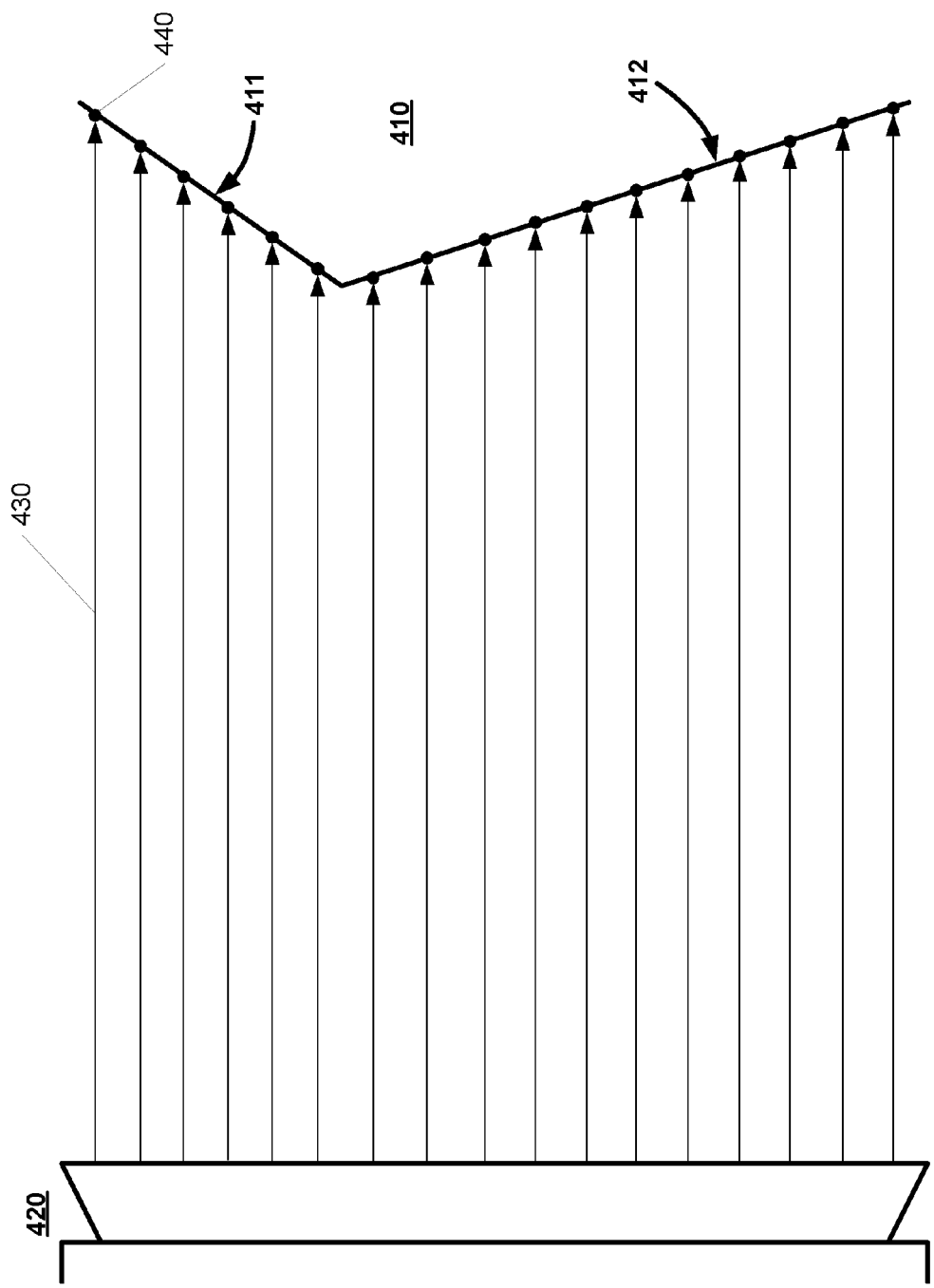

As discussed above, because second object 410 underlies first object 400, all of the hit point information for the second object front surfaces 411 and 412 are made available for rendering the backmost layer of the first object 400. This hit point information is illustrated in FIG. 8C, which shows the second object 410 with the first object 420 completely stripped away. Rays 430 are illustrated extending from the camera 420 and intersecting surfaces 411 and 412 at hit points 440.

For the purposes of the present discussion, it is assumed that the first object 400 has two depth layers: a rear layer comprising rear surfaces 401 and 402, and a front layer comprising front surfaces 403 and 404.

In FIG. 8D, the front depth layer 403-404 of the first object 400 has been stripped away, leaving the rear depth layer 401-402. The fragment shader now renders rear surfaces 401 and 402, using the stored depth information for the rear depth layer 401-402, but using the color and shading information from the hit points on surfaces 411 and 412 of second object 410. The rendering of the rear depth layer 401-402 is illustrated by points 441, corresponding to hit points 440 on surfaces 411 and 412, as indicated by rays 431. The rendered rear depth layer is then stored for use in rendering the front depth layer.

Figure 8E:
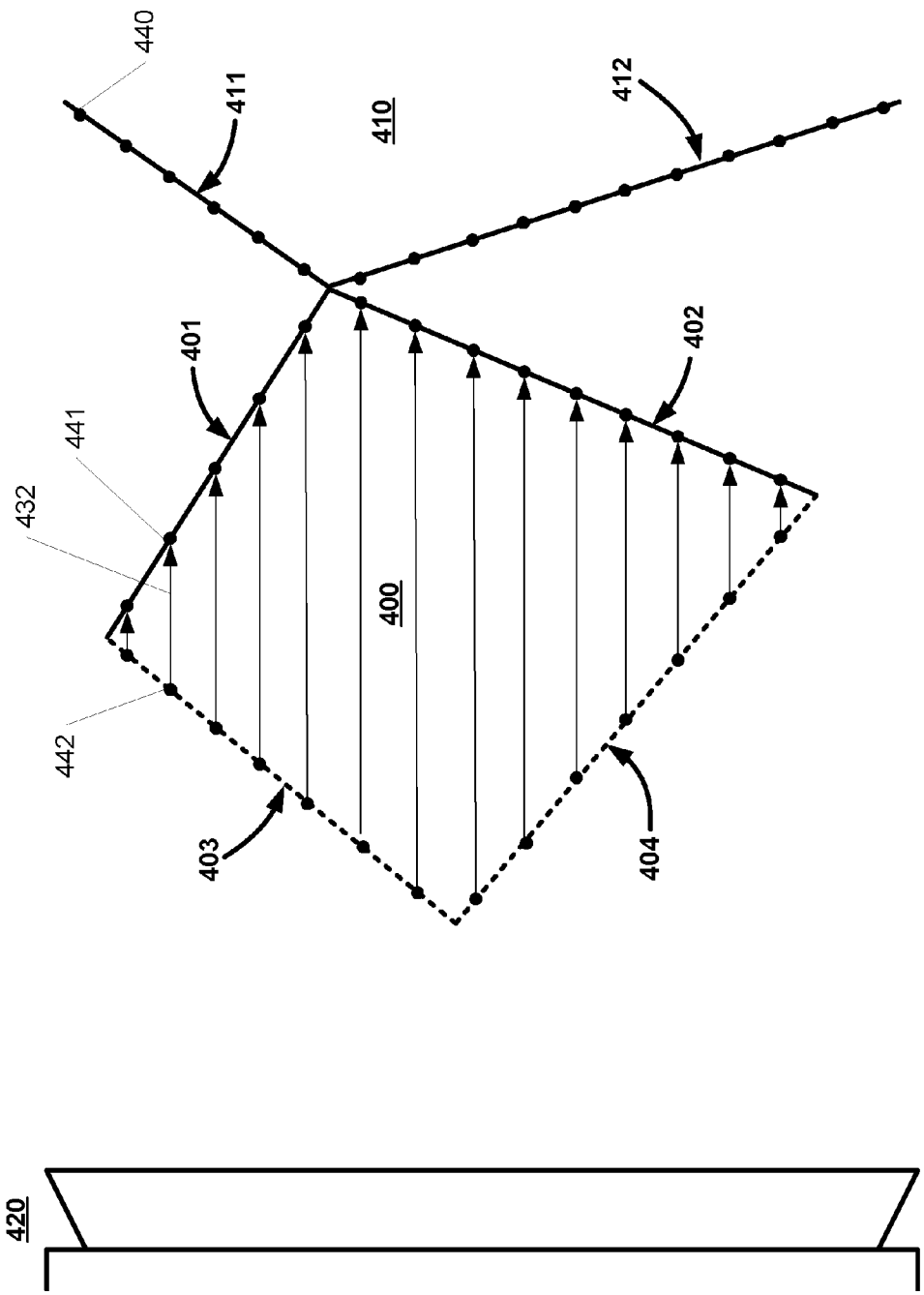

In FIG. 8E, the front depth layer 403-404 of the first object 400 has been restored. The fragment shader now renders front surfaces 403 and 404, using the stored information for the rendered rear depth layer 401-402. The rendering of the front depth layer 403-404 is illustrated by points 442, corresponding to points 441 on surfaces 401 and 402, as indicated by rays 432. As discussed above, it will be seen that the stored information includes information from the hit points 440 on surfaces 411 and 412 of the second object 410.

Figure 8F:
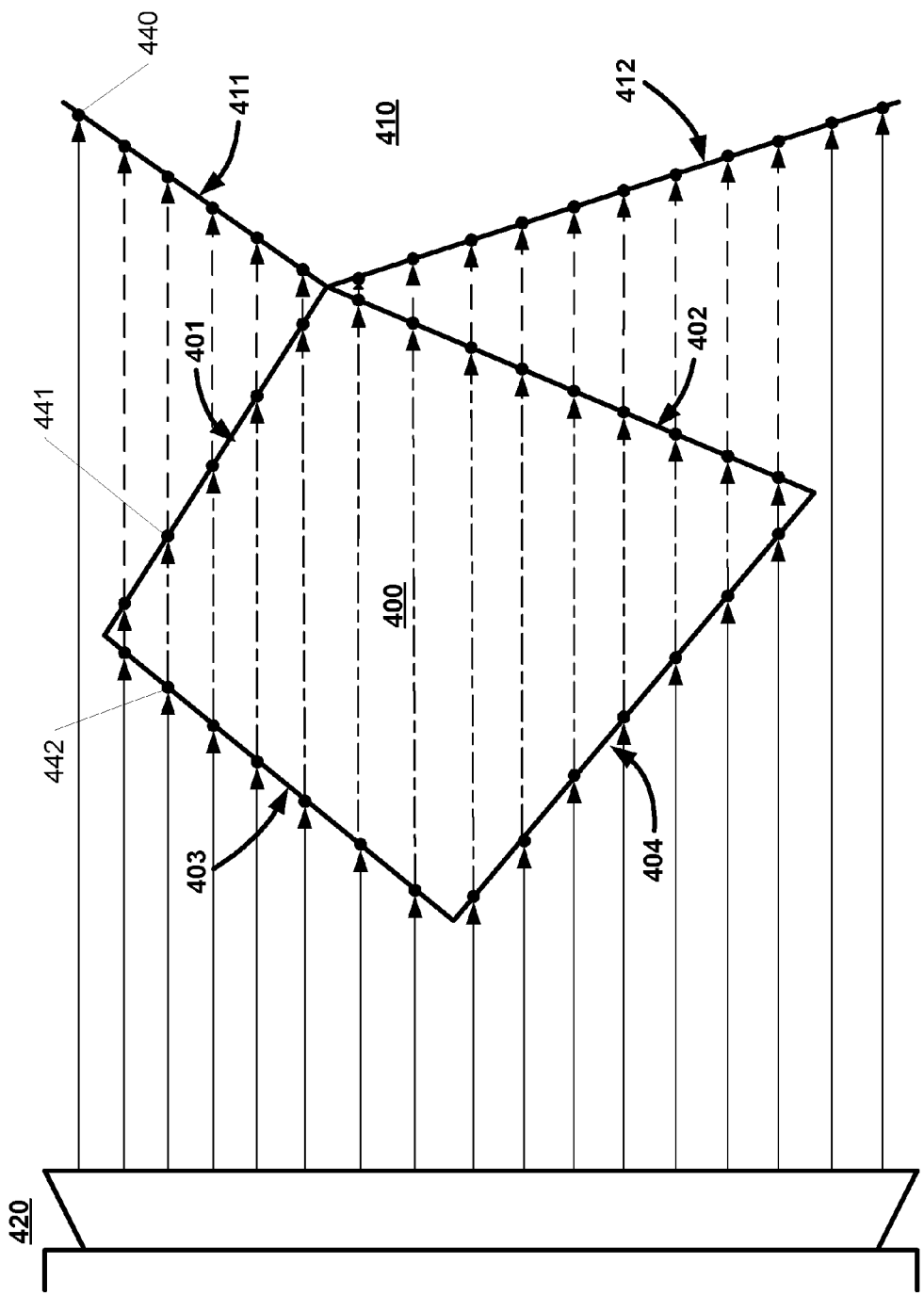

FIG. 8F is a diagram illustrating the rendered transparent object 400. As shown in FIG. 8F, by applying the described techniques, it is possible to achieve the desired visual effect without having to perform an actual ray tracing operation.

3. LOCAL VOLUME RENDERING

In computer graphics, such as those used in creating animated motion pictures, global volume rendering typically applies to atmospheric effects, such as fog. "Local volume effects" are contained volume effects such as fire or smoke, where the effect takes place from the point where the ray enters the volume to the point it leaves it. Local volume rendering can be defined from the entering point of an object up to the point it hits another object or itself.

The presently described technique may be used for local volume rendering because the volume shader will be executed for the distance to the next hit, which is what is available from the current layer to the underneath depth layer. To make sure the volume shader will be executed when entering the volume, a test of the dot product with the incoming ray and the normal of the object should give the side of the volume.

Figure 9:
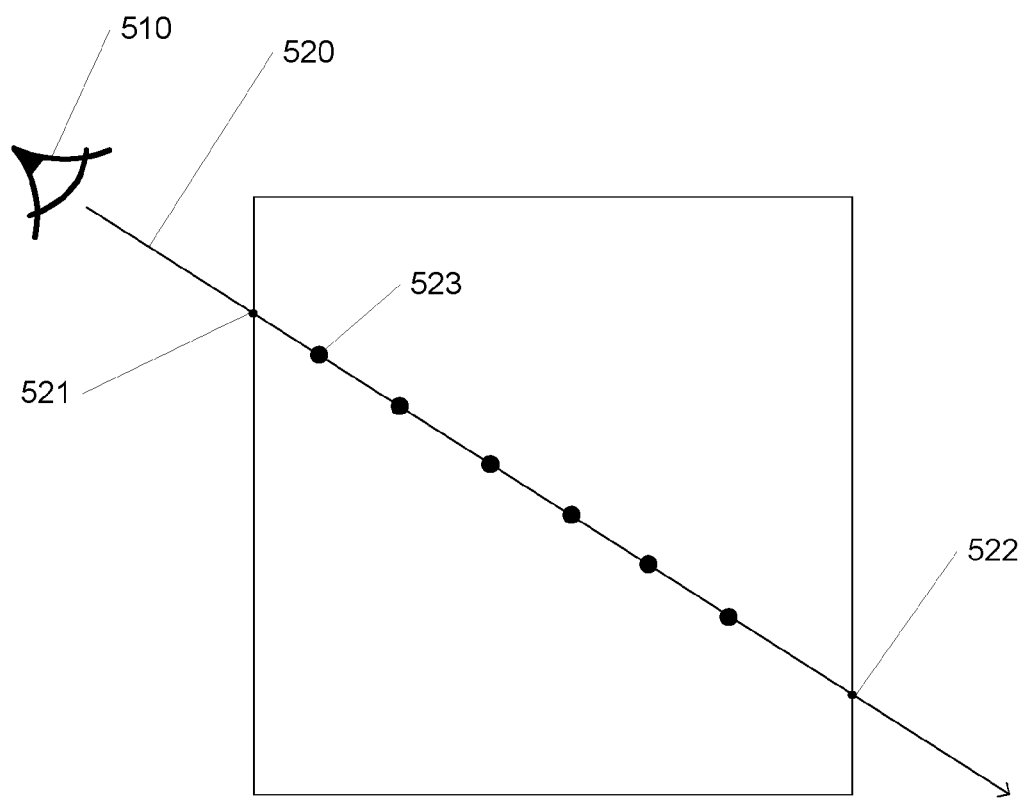
FIG. 9 is a diagram illustrating a local volume rendering technique according to a further aspect of the invention.

With the depth available to next hit point, a shader can implement ray marching as shown in FIG. 9, to do volume rendering. "Ray marching" is a technique for implementing volumetric scattering effects in a ray-tracer. Rather than tracing a ray through the entire distance between the eye and the nearest surface, the ray is "marched" through the distance in small increments, simulating the effect of scattering at each step.

FIG. 9 shows a local volume 500 that is viewed by a camera 510. A ray 520 is shot from the camera 510 through the volume 500. There is an entry point 521, where the ray 520 enters the volume 500, and an exit point 522, where the ray 520 leaves the volume 500. Using a ray marching technique, the ray 520 is marched through the volume 500 along a series of sampling points 523. Applying the described techniques to FIG. 9, it will be seen that the local volume 500 can be depth-peeled at the sampling points, and then rendered back-to-front to achieve the desired visual effect.

With this technique, rendering light cones in a foggy environment is made possible.

4. REFRACTION

It is not generally possible to use the presently described technique, by itself, to achieve an accurate representation of refraction. However, according to a further aspect of the invention, the presently describe technique may be modified to achieve an effect that will achieve an effect of a ray passing through a refractive material. With the normal of the current hit and depth to the next hit made available when sampling the pixels, it is possible to do the lookup along the ray. To do so, it is necessary to project the ray in 2D and sample all pixels until there is a hit or until the texture is exited. This method has a limitation in that it cannot get the part of the scene which was not in the frustum.

Figure 10:
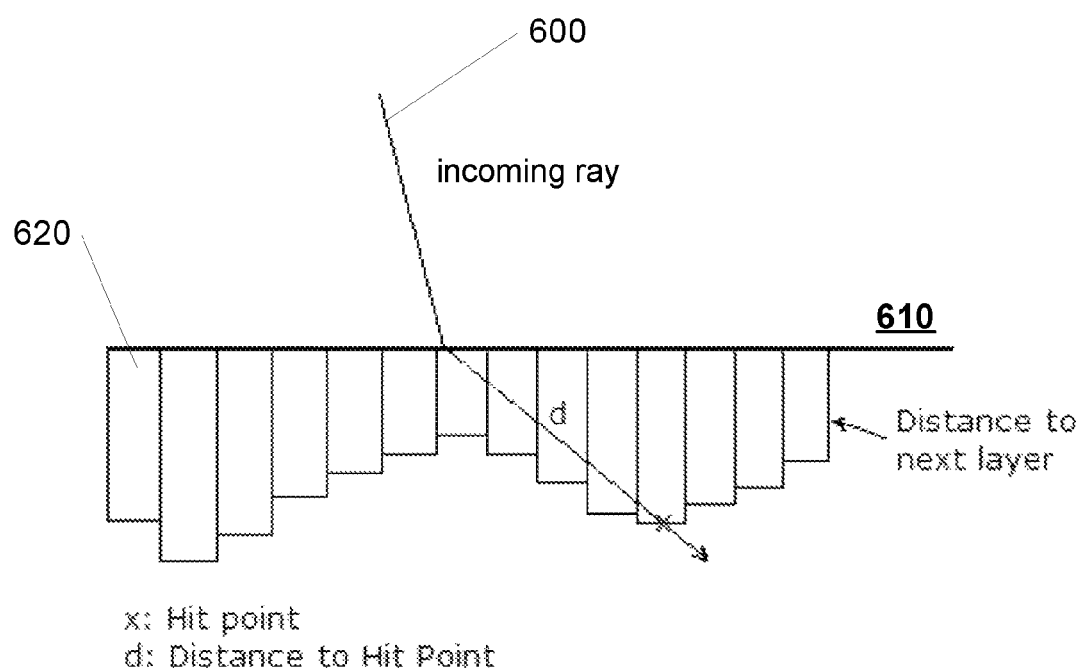
FIG. 10 is a diagram illustrating a technique according to a further aspect of the invention for creating a visual impression of a ray passing through a refractive material.

FIG. 10 shows a two-dimensional cut of an incoming ray 600 entering a refractive material 610, and intersecting with the layer below at point x. As represented by blocks 620, a series of lookups is performed as the ray 600 proceeds through the refractive material 610. A depth-peeling technique can be applied at each lookup 620, followed by back-to-front rendering, as described above.

5. GLOSSY TRANSPARENCY

Another technical advantage of the described technique is the ability to sample the underlying pixels more than once. Doing this allows calculating glossy transparency if the sampling is done around a certain area. By combining the depth layer with the sampling radius, it is possible to use the texture derivatives parameters to sample a larger area, making the image softer at greater distance to the transparent object. However, large depth variance in the sampled layer below will cause artifacts.

Figure 11:
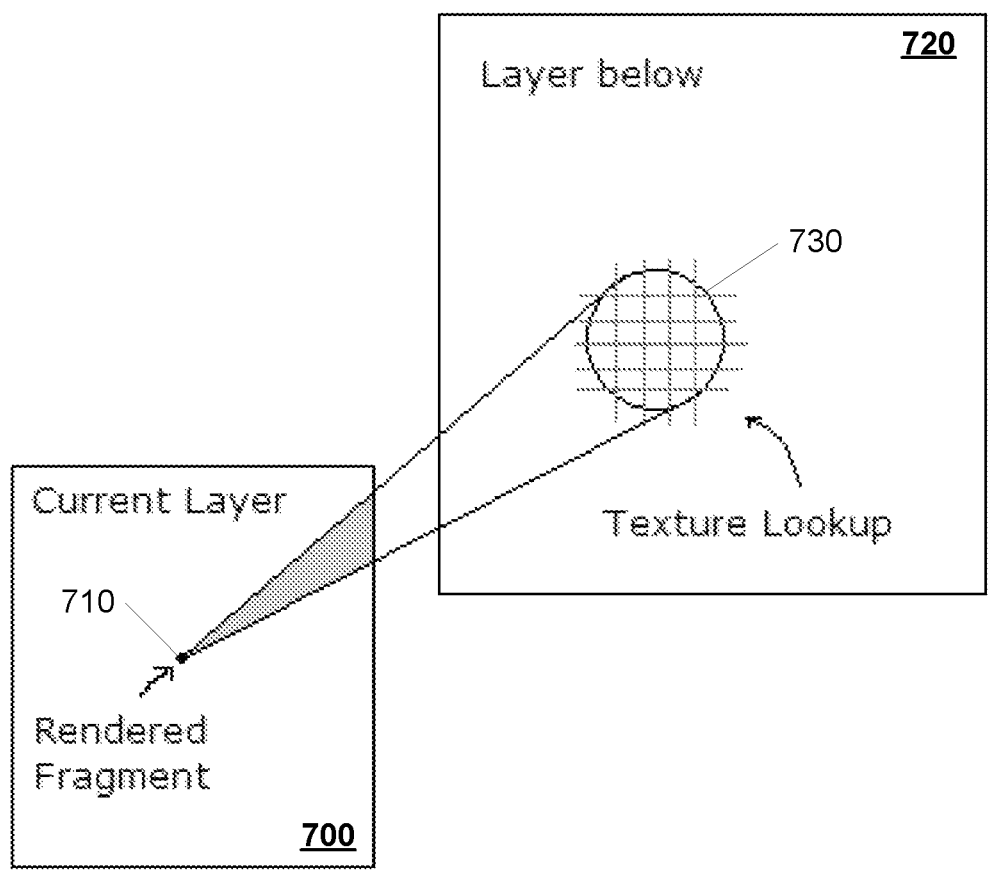
FIG. 11 is a diagram illustrating a technique according to a further aspect of the invention for creating a glossy transparency effect.

FIG. 11 shows how the sampling can be done depending on the distance to the next layer. FIG. 11 shows a current layer 700, having a fragment 701 to be rendered. As shown in FIG. 11, the fragment 701 is rendered using texture information 730 that is looked up from an underlying layer 720.

6. SIMULATED SUB-SURFACE SCATTERING

With all the above techniques, one can also use the information of the light (distance to the light, shadow map) in the local volume shader. This technique can be used to create simulated sub-surface scattering effects.

7. COMBINED METHOD

Figure 12:
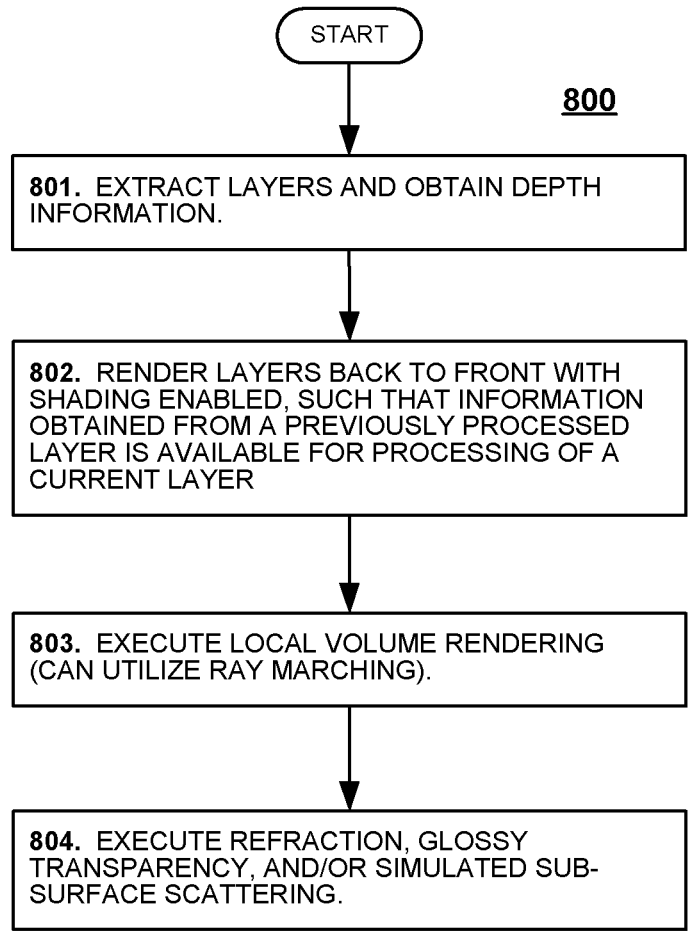
FIG. 12 is a generalized flowchart of a combined technique in accordance with the above described aspects of the invention.

FIG. 12 is a generalized flowchart of a combined technique 800 in accordance with the above described aspects of the invention, including aspects of transparency 801-802, local volume rendering 803, and refraction, glossy transparency, and simulated sub-surface scattering 804.

8. CONCLUSION

Although not a replacement for tracing rays, direct transparency can be achieved with this method. It allows the simulated ray-tracer shader to combine, accumulate, blend or do any other type of computation with the value returned by the traced ray. There may be certain limitations with this method, such as that it restricts the bending of rays to objects visible in the frustum; however, with knowledge of those constraints, excellent rendering effects can be achieved.

9. DIGITAL PROCESSING ENVIRONMENT IN WHICH INVENTION CAN BE IMPLEMENTED

Figure 13:
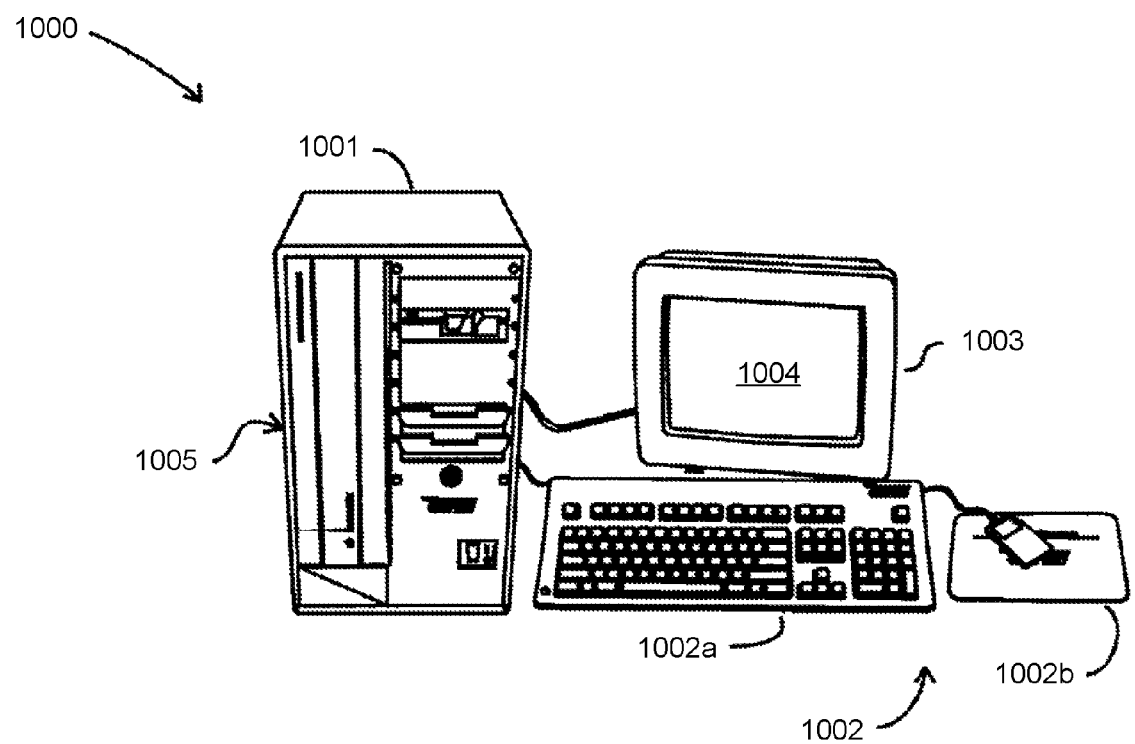
FIGS. 13 and 14A-14B depict illustrative computer systems suitable for practicing described aspects of the present invention.
Figure 14A:
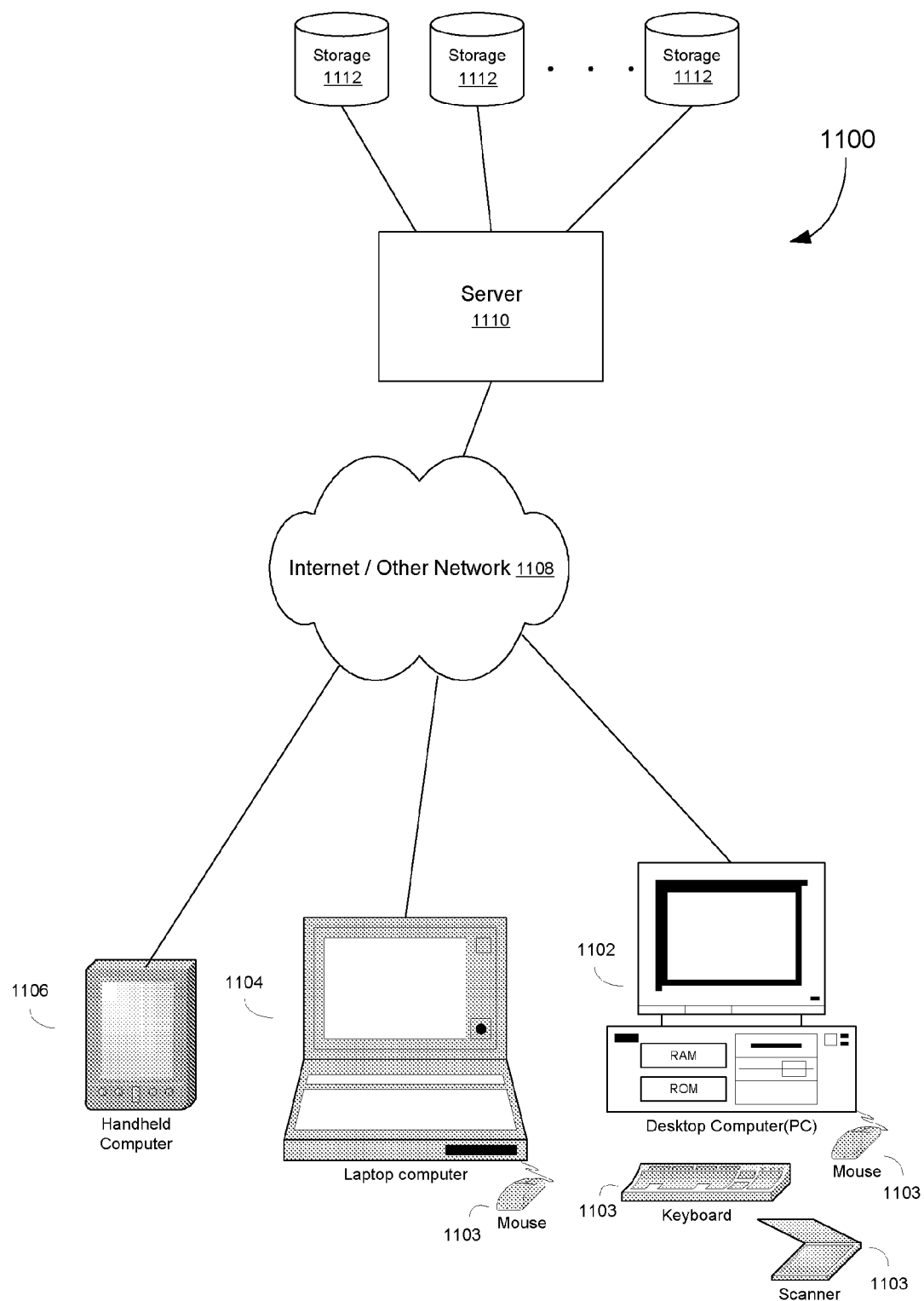
Figure 14B:
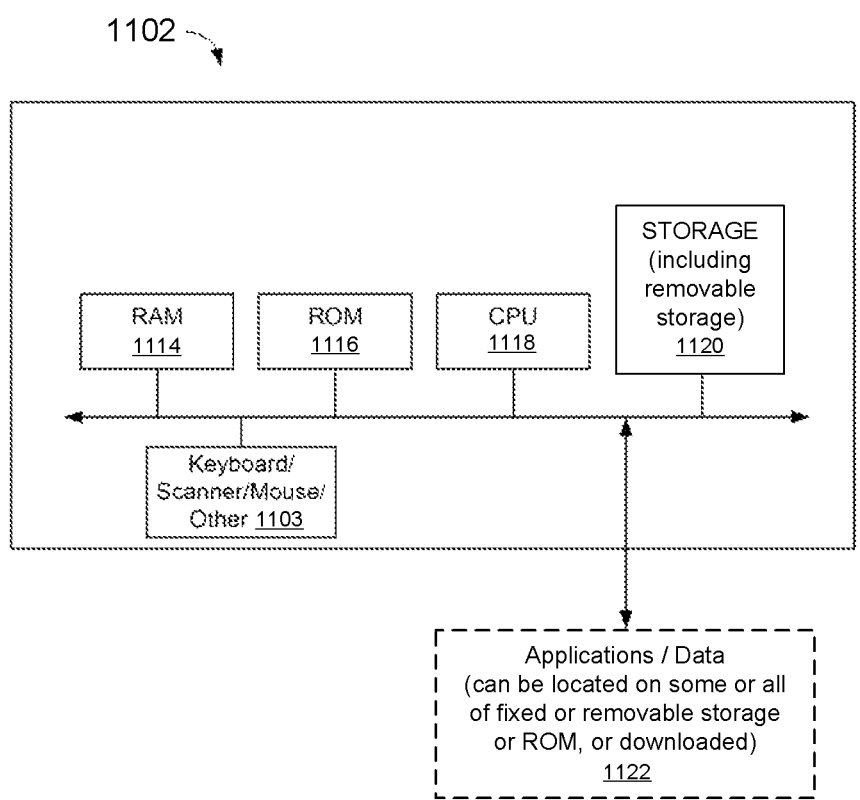

The following is a discussion, to be read in connection with FIGS. 13 and 14A-14B, of typical, relatively conventional digital processing structures and environments in which the above-described invention may be implemented and practiced.

It will be understood by those skilled in the art that the present invention, as described above, provides methods, systems, devices and computer program products that enable the creation of the appearance of rounded corners and edges and other activities in computer graphics systems, whose output is typically a human-perceptible (or digitally stored and/or transmitted) image or series of images that can comprise, for example, an animated motion picture, computer aided design representation, or other typical computer graphics output. The present invention can thus be implemented as part of the computer software or computer hardware of a computer that forms part of a computer graphics system, along with a display, user interface elements such as a keyboard, tablet and/or mouse, memory, storage, and other conventional computer graphics system components. While conventional components of such kind are well known to those skilled in the art, and thus need not be described in great detail herein, the following overview indicates how the present invention can be implemented in conjunction with such components in a computer graphics system.

More particularly, those skilled in the art will understand that the present invention can be utilized in the generation and synthesis of images, such as for display in a motion picture or other dynamic display. The techniques described herein can be practiced as part of a computer graphics system, in which a pixel value is generated for pixels in an image. The pixel value is representative of a point in a scene as recorded on an image plane of a simulated camera. The underlying computer graphics system can be configured to generate the pixel value for an image using a selected methodology, such as that of the present invention.

The previous detailed description illustrates examples of methods, structures, systems, and computer software products in accordance with these techniques. It will be understood by those skilled in the art that the described methods and systems can be implemented in software, hardware, or a combination of software and hardware, using conventional computer apparatus such as a personal computer (PC) or equivalent device operating in accordance with (or emulating) a conventional operating system such as Microsoft Windows, Linux, or Unix, either in a standalone configuration or across a network. The various processing aspects and means described herein may therefore be implemented in the software and/or hardware elements of a properly configured digital processing device or network of devices. Processing may be performed sequentially or in parallel, and may be implemented using special purpose or re-configurable hardware.

As an example, FIG. 13 attached hereto depicts an illustrative computer system 1000 that can carry out such computer graphics processes. With reference to FIG. 13, the computer system 1000 in one embodiment includes a processor module 1001 and operator interface elements comprising operator input components such as a keyboard 1002A and/or a mouse 1002B (or digitizing tablet or other analogous element(s), generally identified as operator input element(s) 1002) and an operator output element such as a video display device 1003. The illustrative computer system 1000 can be of a conventional stored-program computer architecture. The processor module 1001 can include, for example, one or more processor, memory and mass storage devices, such as disk and/or tape storage elements (not separately shown), which perform processing and storage operations in connection with digital data provided thereto. The operator input element(s) 1002 can be provided to permit an operator to input information for processing. The video display device 1003 can be provided to display output information generated by the processor module 1001 on a screen 1004 to the operator, including data that the operator may input for processing, information that the operator may input to control processing, as well as information generated during processing. The processor module 1001 can generate information for display by the video display device 1003 using a so-called "graphical user interface" ("GUI"), in which information for various applications programs is displayed using various "windows."

The terms "memory", "storage" and "disk storage devices" can encompass any computer readable medium, such as a computer hard disk, computer floppy disk, computer-readable flash drive, computer-readable RAM or ROM element or any other known means of encoding digital information. The term "applications programs", "applications", "programs", "computer program product" or "computer software product" can encompass any computer program product consisting of computer-readable programs instructions encoded and/or stored on a computer readable medium, whether that medium is fixed or removable, permanent or erasable, or otherwise. As noted, for example, in block 1122 of the schematic block diagram of FIG. 14B, applications and data can be stored on a disk, in RAM, ROM, on other removable or fixed storage, whether internal or external, and can be downloaded or uploaded, in accordance with practices and techniques well known in the art. As will also be noted in this document, the present invention can take the form of software or a computer program product stored on a computer-readable medium, or it can be in the form of computer program code that can be uploaded or downloaded, or fixed in an FPGA, ROM or other electronic structure, or it can take the form of a method or a system for carrying out such a method. In each case, the invention is operable to enable a computer or computer system to calculate a pixel value for pixels in an image or scene, and the pixel value can be used by other elements of a computer graphics system, which can be conventional elements such as graphics cards, display controllers, or display elements such as LCDs and/or CRTs, to generate a display-controlling electrical or electronic output, and ultimately to enable the display of an image in a human-perceptible form, and/or the storage of such an image (or data specifying such an image) for later display and/or processing.

Although the computer system 1000 is shown as comprising particular components, such as the keyboard 1002a and mouse 1002b for receiving input information from an operator, and a video display device 1003 for displaying output information to the operator, it will be appreciated that the computer system 1000 may include a variety of components in addition to or instead of those depicted in FIG. 13.

In addition, the processor module 1001 can include one or more network ports, generally identified by reference numeral 1005, which are connected to communication links which connect the computer system 1000 in a computer network. The network ports enable the computer system 1000 to transmit information to, and receive information from, other computer systems and other devices in the network. In a typical network organized according to, for example, the client-server paradigm, certain computer systems in the network are designated as servers, which store data and programs (generally, "information") for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

In addition to the computer system 1000 shown in the drawings, methods, devices or software products in accordance with the present invention can operate on any of a wide range of conventional computing devices and systems, such as those depicted by way of example in FIGS. 14A and 14B (e.g., network system 1100), whether standalone, networked, portable or fixed, including conventional PCs 1102, laptops 1104, handheld or mobile computers 1106, or across the Internet or other networks 1108, which may in turn include servers 1110 and storage 1112.

In line with conventional computer software and hardware practice, a software application configured in accordance with the invention can operate within, e.g., a PC 1102 like that shown in FIGS. 14A-14B, in which program instructions can be read from ROM or CD-ROM 1116 (FIG. 14B), magnetic disk or other storage 1120 and loaded into RAM 1114 for execution by CPU 1118. Data can be input into the system via any known device or means, including a conventional keyboard, scanner, mouse, digitizing tablet, or other elements 1103. As shown in FIG. 14B, the depicted storage 1120 includes removable storage. As further shown in FIG. 14B, applications and data 1122 can be located on some or all of fixed or removable storage or ROM, or downloaded.

Those skilled in the art will understand that the method aspects of the invention described herein can be executed in hardware elements, such as a Field-Programmable Gate Array (FPGA) or an Application-Specific Integrated Circuit (ASIC) constructed specifically to carry out the processes described herein, using ASIC construction techniques known to ASIC manufacturers. Various forms of ASICs are available from many manufacturers, although currently available ASICs do not provide the functions described in this patent application. Such manufacturers include Intel Corporation and NVIDIA Corporation, both of Santa Clara, Calif. The actual semiconductor elements of a conventional ASIC or equivalent integrated circuit are not part of the present invention, and will not be discussed in detail herein.

Those skilled in the art will also understand that ASICs or other conventional integrated circuit or semiconductor elements can be implemented in such a manner, using the teachings of the present invention as described in greater detail herein, to carry out the methods of the present invention as shown in FIGS. 1-12, discussed above.

Those skilled in the art will also understand that method aspects of the present invention can be carried out within commercially available digital processing systems, such as workstations and personal computers (PCs), operating under the collective command of the workstation or PC's operating system and a computer program product configured in accordance with the present invention. The term "computer program product" can encompass any set of computer-readable programs instructions encoded on a computer readable medium. A computer readable medium can encompass any form of computer readable element, including, but not limited to, a computer hard disk, computer floppy disk, computer-readable flash drive, computer-readable RAM or ROM element. or any other known means of encoding, storing or providing digital information, whether local to or remote from the workstation, PC or other digital processing device or system. Various forms of computer readable elements and media are well known in the computing arts, and their selection is left to the implementer. In each case, the invention is operable to enable a computer system to calculate a pixel value, and the pixel value can be used by hardware elements in the computer system, which can be conventional elements such as graphics cards or display controllers, to generate a display-controlling electronic output. Conventional graphics cards and display controllers are well known in the computing arts are not necessarily part of the present invention, and their selection can be left to the implementer.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

I claim:

1. A method, executable in a computer graphics system, the computer graphics system being operable to render images for storage or for displaying on a display element, the computer graphics system comprising a shader for shading elements and layers of an image representation, the displaying comprising the display of images on the display element, wherein the rendering of an image comprises utilizing the shader and the computer graphics system to generate pixel values corresponding to pixels in an image representation, the method comprising:
    configuring the shader to execute transparency rendering, the transparency rendering comprising:
    (A) in the shader, first extracting a plurality of layers of an image representation and obtaining depth information therefrom, and
    (B) in the shader, then rendering the plurality of layers back-to-front with shading enabled, such that information obtained from a previously processed layer is available for processing of a current layer, to enable accurate rendering of transparency; and
    configuring the shader to execute local volume rendering, using information obtained from the layer extracting, wherein executing local volume rendering comprises utilizing ray marching.

2. In the system of claim 1, the further improvement comprising executing, in the shader, a refraction method, the refraction method comprising projecting a ray in 2D, sampling pixels along the ray and utilizing information relating to the normal of a current hit and depth to the next hit made available when sampling the pixels.

3. In the system of claim 1, the further improvement comprising calculating, in the shader, glossy transparency by executing sampling around a selected area, and combining information relating to the depth layer with information relating to the sampling radius.

4. In the system of claim 1, the further improvement comprising utilizing, in the shader, information relating to distance to an illumination source and shadow map information within a local volume shader, to create simulated sub-surface scattering effects.

5. A subsystem operable in a computer graphics system, the computer graphics system being operable to render images for storage or for displaying on a human-perceptible display element, the computer graphics system comprising a shader for shading elements and layers of an image representation, the displaying comprising the display of images on the display element, wherein the display element is operable to generate a display in accordance with pixel values generated by the shader and the computer graphics system, the subsystem comprising:
    means in the shader, for executing a transparency rendering method, the means for executing a transparency rendering method comprising:
    (A) means for first extracting a plurality of layers of an image representation and obtaining depth information therefrom, and
    (B) means for then rendering the plurality of layers back-to-front with shading enabled, such that information obtained from a previously processed layer is available for processing of a current layer, to enable accurate rendering of transparency; and
    (C) means for executing local volume rendering, using information obtained from the layer extracting, wherein executing local volume rendering comprises utilizing ray marching.

6. A computer program product comprising a non-transitory, computer-readable storage medium and computer-executable program code stored on the computer-readable storage medium, the computer-executable program code being executable by a computer graphics system, the computer graphics system being operable to render images for storage or for display on a display element responsive to electrical signals representative of pixel values, the computer graphics system comprising a shader for shading elements and layers of an image representation, the rendering of an image comprising utilizing the shader and the computer graphics system to generate pixel values corresponding to pixels in an image representation, the computer-executable program code comprising:
    first computer-executable program code that when executed in the computer graphics system performs transparency rendering, the first computer-executable program code comprising:

(A) computer-executable program code for first extracting a plurality of layers of an image representation and obtaining depth information therefrom,
(B) computer-executable program code for rendering the extracted plurality of layers back-to-front with shading enabled, such that information obtained from a previously processed layer is available for processing of a current layer, to enable accurate rendering of transparency; and
(C) computer-executable program code for executing local volume rendering, using information obtained from the layer extracting, wherein executing local volume rendering comprises utilizing ray marching.

7. The computer program product of claim 6 further comprising:
   computer-executable program code that when executed in the computer graphics system performs a refraction method, the refraction method comprising projecting a ray in 2D, sampling pixels along the ray and utilizing information relating to the normal of a current hit and depth to the next hit made available when sampling the pixels.

8. The computer program product of claim 6, further comprising:
   computer-executable program code that when executed in the computer graphics system calculates glossy transparency by executing sampling around a selected area, and combining information relating to the depth layer with information relating to the sampling radius.

9. The computer program product of claim 6, further comprising:
   computer-executable program code that when executed in the computer graphics system utilizes information relating to distance to an illumination source and shadow map information within a local volume shader, to create simulated sub-surface scattering effects.

* * * * *